Oct. 18, 1932.  M. P. GRAHAM  1,883,782
SELF ADJUSTING BALL JOINT
Filed Dec. 24, 1928
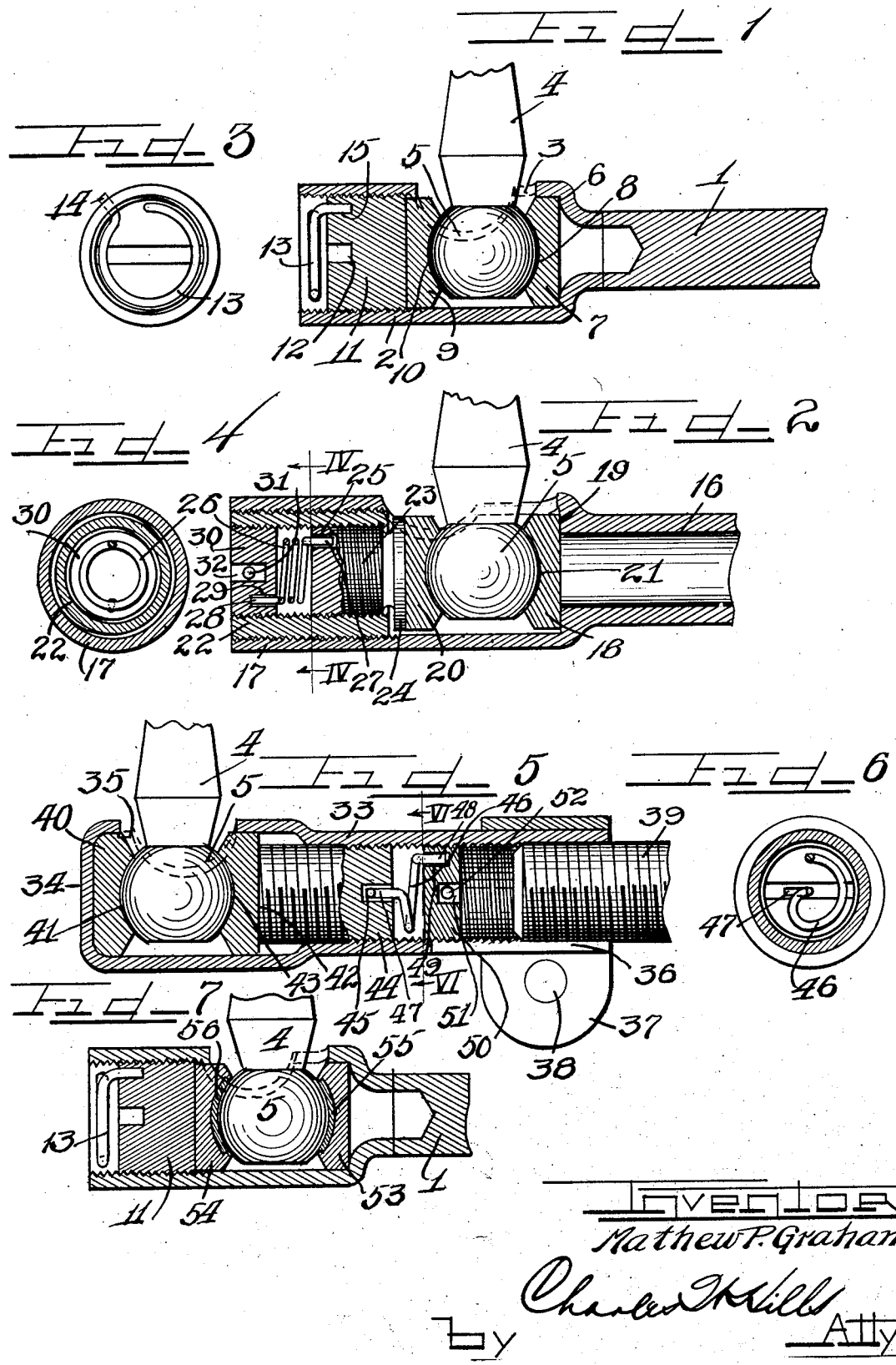
Inventor
Mathew P. Graham
by Charles H. Wills
Attys.

Patented Oct. 18, 1932

1,883,782

UNITED STATES PATENT OFFICE

MATTHEW P. GRAHAM, OF DETROIT, MICHIGAN, ASSIGNOR TO THOMPSON PRODUCTS, INC., OF DETROIT, MICHIGAN, A CORPORATION OF MICHIGAN

SELF-ADJUSTING BALL JOINT

Application filed December 24, 1928. Serial No. 328,209.

This invention relates to a self adjusting ball joint and particularly to one for use in connection with connecting links, tie rods, drag links, and the like, which joint is self adjusting for wear, and which prevents rattle in service.

An object of the invention is to provide a ball joint construction which is strong and durable and in which wear due to pounding is eliminated.

Another object is to provide a ball joint in which the several elements are automatically retained tightly together at all times to reduce wear incidental to pounding.

A further object of the invention is to provide a ball joint in which an internal plug is subject to automatic rotation in a direction to provide tight cooperation of the several members at all times.

A still further object of the invention is to provide a ball joint which is economical to manufacture and efficient and positive in use.

The above, other and further objects of the invention will be apparent from the following description, accompanying drawing and appended claims.

According to the invention, an internal plug is threaded against one of the ball seats, and is urged against such seat at all times by automatic means tending to rotate such plug towards and against said seat, thereby keeping the various parts tightly together.

The invention is illustrated in certain forms in the accompanying drawing and the views thereof are as follows:

Figure 1 is a vertical central sectional view through a ball joint construction embodying this invention.

Figure 2 is a central vertical section through a ball joint embodying this invention and showing the different means for retaining the beveled parts in operative relation.

Figure 3 is an end view of Figure 1.

Figure 4 is a section taken on line IV—IV of Fig. 2.

Figure 5 is a longitudinal vertical central section through a ball joint embodying this invention, and showing certain parts arranged in different relative positions.

Figure 6 is a section taken on line VI—VI of Fig. 5.

Figure 7 is a view similar to Figure 1 showing anti-friction bearings interposed between the ball and the ball seat.

The form of the invention illustrated in Figures 1 and 3 is such as to lend itself readily in connection with a shock absorber. A rod 1 is provided with an enlarged shell-like end 2, having a lateral opening 3. A ball stud 4 having a ball 5 at the end thereof is inserted in the shell 2 through the opening 3.

The diameter of the shell 2 is greater than the rod 1, there being a shoulder 6 formed in the end of the shell adjacent the rod 1.

An inner ball seat 7 having a segmental spherical surface 8 is arranged against the shoulder 6 in position to have the spherical surface 8 thereof in contact with a portion of the surface of the ball 5. A similar ball seat 9, having a like spherical surface 10, is arranged on the other side of the ball 5.

The interior of the open end of the shell 2 is threaded, and a plug 11 is threaded into the threaded end of the shell 2 against the outer ball seat member 9. The plug 11 is provided with a transverse slot 12, wherein may be applied a suitable tool for tightening the plug against the ball seat 9.

It has been found that due to the shocks imposed on such a ball joint, a slight separation of the parts takes place, resulting in inefficient operation of the joint and oftentimes damage to the same.

The plug 11 is retained at all times tightly against the ball seat member 9 by means of a torsion spring 13, which as illustrated in Figures 1 and 3, has an end 14 passed through a suitably disposed aperture in the wall of the shell 2, and with its other end bent axially and arranged within an aperture 15 in the plug 11. The aperture 15 is axially arranged in the plug and is disposed near the periphery of the same. The formation of the spring 13 is such as to cause said spring to normally turn the plug towards the ball 5 and thus at all times, retain the ball seat 9 tightly against the ball. Shock imposed on the ball joint may tend to move the plug rearwardly, or to the left, as observed in Figure 1, whereupon said spring 13 will become effective to turn the plug to the right, or forwardly, thus maintaining at all times the ball seat 9 tightly against the ball 5 to prevent noise, chatter, and wear incidental to pounding or other service.

The form of the invention illustrated in Figures 2, 4, 5 and 6 is such as might be employed in connection with a drag link and tie rod, used in connection with the steering apparatus of a motor vehicle.

The arrangement shown in Figure 2 comprises a tie rod 16, having an enlarged end shell or housing 17 formed with the rod 16. The tie rod 16 is shown as hollow. The housing 17 is provided with a lateral opening of sufficient size to admit the ball 5 on the ball stud 4, and also to receive the ball seat members. One seat member 18 is arranged against a shoulder 19 formed in the inner end of the housing 17, while a similar ball seat 20 is disposed on the other side of the ball 5. Each of the ball seat members 18 and 20 has a segmental spherical surface 21 conforming to the contour and size of the ball 5.

The interior of the outer end of the shell 17 is threaded. A sleeve 22, threaded on the exterior and interior thereof is threaded into the open end of the housing 17. Prior to insertion of the sleeve 22 in the housing 17, a screw plug 23, having an enlarged end 24 is screwed into the sleeve 22, so that when said sleeve is inserted in the housing 17, said end 24 of the plug will bear against the ball seat 20. The plug 23 is tightened against the ball by any suitable means.

The plug 23 is provided with an eccentric axially disposed aperture 25 extending inwardly from the end of said plug opposite to that on which the end 24 is arranged. The torsion spring 26, having its end bent outwardly and extending in the opposite direction is arranged with one end 27 in the aperture 25 in the plug 23, while the other end 28 thereof is inserted in an axially extending eccentric opening 29 in an end plug member 30 which is screwed into the interior of the threaded sleeve 22. The end plug 30 is tightened until the spring 26 is placed under sufficient torsion so as to at all times tend to urge the plug 23 towards the ball seat member 20. The plug 30 is adjusted to secure proper tension of the spring 26, and then said plug is locked in position by means of a pin 31 passing through a slot 32 in the plug and through suitable disposed openings in the sleeve 22 and/or the housing 17.

The form of the invention illustrated in Figures 5 and 6 includes a housing 33 closed at one end 34, and having a lateral opening 35 for the reception of the ball stud 4, and its attached ball end 5, as well as for the insertion of the ball seat members. The other end of the housing 33 is open and is threaded interiorly thereof for some distance inwardly of the open end. The housing is slit at 36 and depending lugs 37 are integrally formed to the housing, one on each side of the slit. Said lugs are provided with apertures 38 for the reception of a screw or bolt to draw said lugs together. A tie rod 39, or other connecting member, having a threaded end is threaded into the open end of the housing 33, and locked in adjusted axial position by a bolt clamping the lugs 37 about the rod 39.

The ball seat member 40 is arranged against the closed end 34 of the housing, and is provided with a segmental spherical surface 41 for cooperating with the ball 5. Another ball seat member 42, having a similar spherical surface 43, is arranged against the other side of the ball. A screw plug 44 is inserted in the open end of the housing before the application of the rod 39 thereto and screwed against the ball seat member 42 by a suitable tool being inserted in a slot 45 formed in the end of the said plug.

The torsion spring 46 is arranged in laterally extending end 47 which is inserted in the slot 45 in the plug 44. The other end of the torsion spring 48 extends in the opposite direction and away from the body of the spring, and is arranged to enter an axially extending eccentric opening 49 in a screw plug 50 which is inserted from the open end of the housing 33 prior to the application of the tie rod 39 to the housing. The plug 50 is provided with a slot 51, whereby a suitable tool may be applied to said plug for properly tensioning the spring 46. When the spring 46 has been properly tensioned, the plug 50 is locked in position in the housing 33 by a pin 52 passing through the slot in said plug and engaging suitably disposed apertures in the housing 33.

The form of the invention shown in Figure 7 is similar to that shown in Figure 1 except that the ball seat members 53 and 54 have recesses formed in the faces thereof in which recesses are inserted anti-friction bearings 55 and 56. The screw plug 11 acts against the bearing seat 54 in the same manner as described with reference to plug 11 and bearing seat member 9 in Figure 1.

The ball joints which are used in connection with drag links, tie rods, and the like, for automobile steering mechanisms are subject to terrific pounding due to the road conditions. Such poundings tend to cause undue wear between the ball and the ball seat members, resulting in chattering or rattling of the parts, and sometimes in the destruction of some of the parts to such an extent as to render the steering mechanism inefficient, if not totally ineffective. This invention overcomes the wear due to pounding, inasmuch as the plug members bearing against the ball seat members tend at all times to maintain the ball seat members tightly against the ball. This tension is secured by reason of the provision of the springs as above described, which function in such manner as to advance the screw plugs against the ball seat members, and to resist any effort to rotate the plugs in the opposite direction.

Ball joints used in connection with tie rods and drag links embodying this invention have proved to be very efficient and successful in use overcoming completely the rattle and chatter heretofore present, and also eliminating any wear incidental to pounding.

This invention has been described herein more or less precisely; yet it is to be understood that changes may be made in the arrangement and proportion of parts and that equivalents may be substituted without departing from the spirit and scope of the invention.

The invention is claimed as follows:

1. A ball joint comprising a housing member having a cylindrical bore extending through one end thereof, said bore terminating in a shoulder at the other end of the housing, ball seat members in said housing, one of which rests against said shoulder, a ball stud, having a ball end positioned between said seat members, a screw plug threaded in said bore and bearing against one of said seat members, a second plug threaded in said bore through the open end thereof, securing means for said second plug and a torsional spring secured at its ends to said plugs for urging said first plug against the other of said seat members.

2. A ball joint construction comprising a ball stud having a ball end and a socket member for receiving said ball end, a cylindrical bore extending through one end of said socket member and terminating in a shoulder, a ball seat member for one side of said ball end contacting the shoulder at the end of said cylindrical bore, a second ball seat member on the opposite side of said ball end, a screw plug threaded in said cylindrical bore bearing against said second ball seat member, and adjustable torsional means operated by a second screw plug in said cylindrical bore for urging said first plug against said second seat member.

3. A ball joint construction comprising a housing member having a cylindrical bore extending through one end thereof, said bore terminating in a shoulder at the other end of the housing, ball seat members in said housing one of which rests against said shoulder, a ball stud having a ball end positioned between said seat members, a hollow sleeve member threaded in said bore through the open end thereof, a screw plug threaded in said sleeve and bearing against one of said ball seat members, said screw plug having an enlarged end, a second screw plug threaded in said sleeve, locking means for said second screw plug, and torsional spring means secured at its ends to said plugs for urging said first plug against the seat member bearing thereon.

4. A ball joint construction for a tie rod end, comprising a housing formed on said tie rod, a pair of ball seats in said housing, a ball stud having a ball end positioned between said ball seats, a sleeve threaded in said housing, means carried by said sleeve and adapted to be advanced by rotation to urge a seat against said ball, and a torsion member comprising a coiled spring in said sleeve and cooperatively connected therewith and to said means conditioned to rotate said means.

In testimony whereof I have hereunto subscribed my name at Detroit, Wayne County, Michigan.

MATTHEW P. GRAHAM.